United States Patent
Weisbuch

(10) Patent No.: US 9,646,220 B2
(45) Date of Patent: May 9, 2017

(54) METHODS AND MEDIA FOR AVERAGING CONTOURS OF WAFER FEATURE EDGES

(71) Applicant: GLOBALFOUNDRIES, Inc., Grand Cayman (KY)

(72) Inventor: Francois Weisbuch, Dresden (DE)

(73) Assignee: GLOBALFOUNDRIES, INC., Grand Cayman (KY)

( * ) Notice: Subject to any disclaimer, the term of this patent is extended or adjusted under 35 U.S.C. 154(b) by 136 days.

(21) Appl. No.: 14/088,824

(22) Filed: Nov. 25, 2013

(65) Prior Publication Data

US 2015/0146966 A1 May 28, 2015

(51) Int. Cl.
*G06K 9/00* (2006.01)
*G06K 9/46* (2006.01)
*G06T 5/50* (2006.01)
*G06T 7/00* (2017.01)

(52) U.S. Cl.
CPC ............. *G06K 9/4604* (2013.01); *G06T 5/50* (2013.01); *G06T 7/001* (2013.01); *G06T 7/0085* (2013.01); *G06T 2207/10061* (2013.01); *G06T 2207/20216* (2013.01); *G06T 2207/30148* (2013.01)

(58) Field of Classification Search
CPC .......... G06K 9/4604; G06T 7/001; G06T 5/50
USPC ..... 382/145; 716/53–55, 106, 112, 135–136; 250/307, 310–311
See application file for complete search history.

(56) References Cited

U.S. PATENT DOCUMENTS

| | | | |
|---|---|---|---|
| 6,221,539 B1 * | 4/2001 | Kotani et al. | 430/5 |
| 7,694,267 B1 * | 4/2010 | Ye et al. | 716/53 |
| 7,923,703 B2 * | 4/2011 | Morokuma et al. | 250/492.22 |
| 8,338,804 B2 * | 12/2012 | Morokuma et al. | 250/492.22 |
| 2005/0108310 A1 * | 5/2005 | Conrad et al. | 708/290 |
| 2007/0074143 A1 * | 3/2007 | Bailey Cobb et al. | 716/21 |
| 2008/0120589 A1 * | 5/2008 | Tsutsui et al. | 716/19 |
| 2008/0130982 A1 * | 6/2008 | Kitamura et al. | 382/144 |
| 2009/0232385 A1 * | 9/2009 | Matsuoka et al. | 382/145 |
| 2011/0202898 A1 * | 8/2011 | Kusnadi et al. | 716/135 |

OTHER PUBLICATIONS

Tabery et al. "Evaluation of OPC quality using automated edge placement error measurement with CD-SEM", Proc. SPIE 6152, Metrology, Inspection, and Process Control for Microlithography XX, vol. 6152, 2006.*
Tabery el al., "SEM Image Contouring for OPC Model calibration and verification", Proc. SPIE 6520, Optical Microlithography XX, vol. 652019, (Mar. 27, 2007).*
Vasek et al., "SEM-Contour Based OPC Model Calibration through the process Window", Proc. SPIE 6518, Metrology, Inspection, and Process Control for Microlithography XXI, 65180D, (Apr. 4, 2007).*

* cited by examiner

*Primary Examiner* — Samir Ahmed
(74) *Attorney, Agent, or Firm* — Lorenz & Kopf, LLP

(57) ABSTRACT

A method of determining an average contour of a patterned feature on a wafer includes providing a reference contour corresponding to the patterned feature on the wafer, providing a plurality of images of the patterned feature, extracting from the plurality of images a plurality of extracted contours that represent the patterned feature, eliminating flyers from the plurality of extracted contours, and generating the average contour of the patterned feature based on the extracted contours remaining after elimination of the flyers.

18 Claims, 8 Drawing Sheets

METHODS AND MEDIA FOR AVERAGING CONTOURS OF WAFER FEATURE EDGES

TECHNICAL FIELD

Embodiments of the present disclosure are generally directed to methods and media for averaging contours of wafer feature edges. More particularly, embodiments of the present disclosure are directed to methods and media for averaging contours extracted from images using flyer contour elimination.

BACKGROUND

Generally, integrated circuits and other semiconductor devices are used in a variety of electronic applications, such as computers, cellular phones, personal computing devices, and many other applications. Home, industrial, and automotive devices, which in the past included only mechanical components, now have electronic parts that require semiconductor devices.

Semiconductor devices are manufactured by depositing many different types of material layers over a semiconductor workpiece or wafer, and patterning the various material layers using lithography. The material layers typically include thin films of conductive, semiconductive, and insulating materials that are patterned and etched to form integrated circuits (IC's). There may be a plurality of transistors, memory devices, switches, conductive lines, diodes, capacitors, logic circuits, and other electronic components formed on a single die or chip.

Lithography involves the transfer of an image of a mask to a material layer of a die or chip, also referred to as a wafer. The image is formed in a layer of photoresist, the photoresist is developed, and the photoresist is used as a mask during a process to alter the material layer, such as etching and patterning the material layer.

The size and shape of features on the patterned material layer and photoresist are sometimes checked using a critical dimension scanning electron microscope (CD-SEM). The CD-SEM takes top-down images of the feature of interest with high-magnification. The contours of the patterned features may then be extracted from the images by processing the gray level pixels of the CD-SEM image.

Processing CD-SEM images involves analyzing complex shapes from images that often have poor image contrast and image noise. The complexity, contrast, and noise lead to high uncertainty in the extracted contours. Some methods average the extracted contours of dozens of CD-SEM images to improve the contour quality. These averaging methods, however, are not robust against large edge detection errors in single extracted contours that may largely influence the average contour.

As such, it is desirable to provide more robust methods and systems for averaging contours. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Methods and media for determining an average contour of a patterned feature of a wafer are disclosed herein. In an exemplary embodiment, a method of determining an average contour of a patterned feature on a wafer includes providing a reference contour corresponding to the patterned feature on the wafer, providing a plurality of images of the patterned feature, extracting from the plurality of images a plurality of extracted contours that represent the patterned feature, eliminating flyers from the plurality of extracted contours, and generating the average contour of the patterned feature based on the extracted contours remaining after elimination of the flyers.

In accordance with another exemplary embodiment, a method of inspecting a patterned feature on a wafer includes determining an average contour of the patterned feature on the wafer and inspecting the average contour of the patterned feature. Determining the average contour of the patterned feature includes providing a reference contour corresponding to the patterned feature on the wafer, providing a plurality of images of the patterned feature, extracting from the plurality of images a plurality of extracted contours that represent the patterned feature, eliminating flyers from the plurality of extracted contours, and generating the average contour of the patterned feature based on the extracted contours remaining after elimination of the flyers.

In accordance with another exemplary embodiment, a non-transitory computer readable medium storing control logic for operating a computer system includes control logic instructions. The control logic instructions are configured for providing a reference contour corresponding to a patterned feature on a wafer, providing a plurality of images of the patterned feature, extracting from the plurality of images a plurality of extracted contours that represent the patterned feature, eliminating flyers from the plurality of extracted contours, and generating the average contour of the patterned feature based on the extracted contours remaining after elimination of the flyers.

In accordance with another exemplary embodiment, a method of identifying regions with unreliable contour extraction from images of a patterned feature on a wafer is provided. The method includes providing a base contour corresponding to the patterned feature on the wafer, providing a plurality of extracted contours that are generated from images of the patterned feature, generating a confidence interval band for a point on the base contour, and comparing the confidence interval band with a confidence band width threshold to identify regions with unreliable contour extraction.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Exemplary embodiments of the present disclosure will hereinafter be described in conjunction with the following drawing figures, wherein like numerals denote like elements, and wherein.

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Embodiments of the present disclosure provide methods of determining an average contour of a patterned feature on a wafer. The patterned feature may be any feature to be measured on the wafer, such as etched/patterned material layers of the wafer or a developed photoresist layer. In some embodiments, the methods provided herein may be used to inspect the patterned feature for various purposes. For example, the average contour may be inspected to characterize a mathematical model for use in optical proximity correction techniques. In some embodiments, the average contour may be inspected for tool matching by comparing images from different tools or for optical rule verification by analyzing contour variations due to changes in process.

Figure 1:
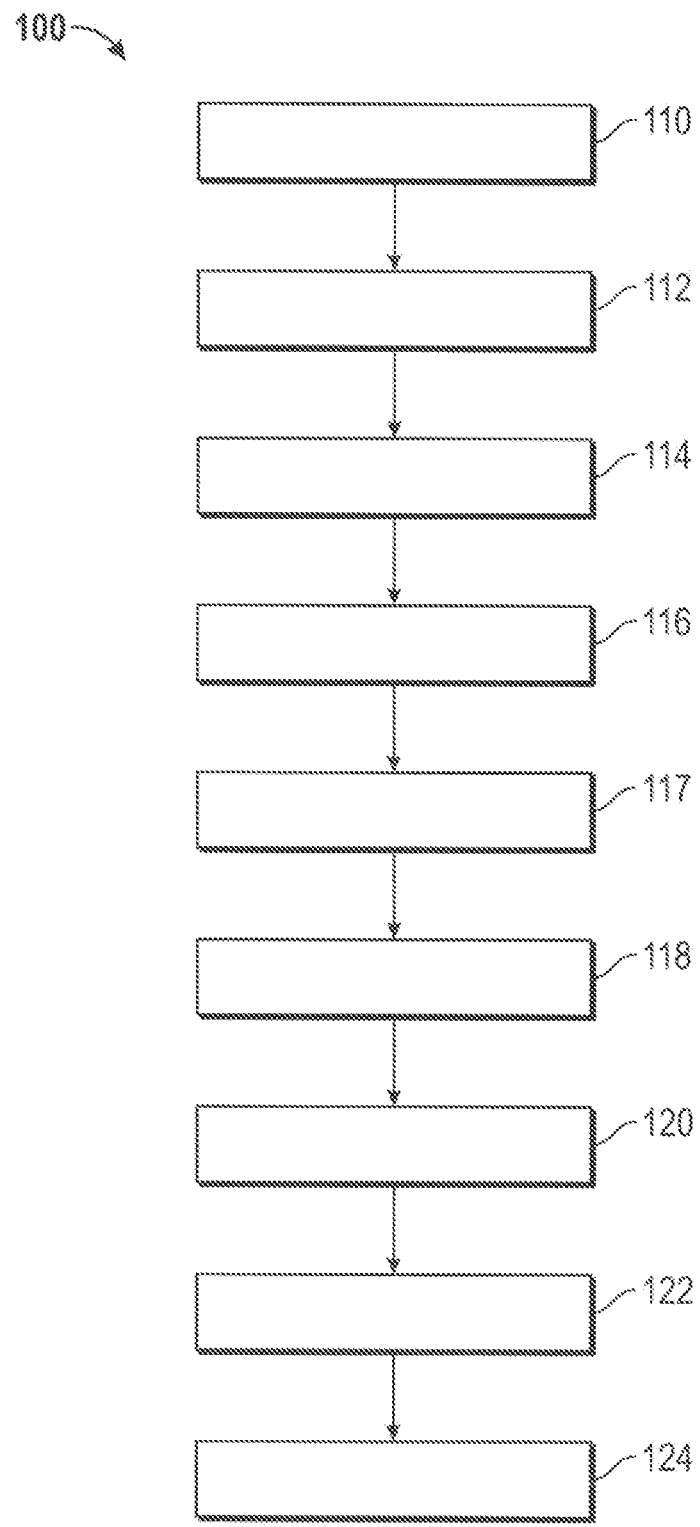
FIG. 1 is a flow diagram for a method of determining an average contour of a patterned feature on a wafer in accordance with various embodiments.

Referring now to FIG. 1, a method 100 of determining an average contour of a patterned feature on a wafer is illustrated in diagram form. In some embodiments, the operations of the method 100 are executed by a computer system, such as the one described below with reference to FIG. 6. In some embodiments, the operations of the method 100 are instructions in control logic stored on a non-transitory computer readable medium.

A reference contour corresponding to the patterned feature is provided in operation 110. The reference contour is a digital representation of the edges of the patterned feature. In the embodiment provided, the reference contour is a simulated contour of the patterned feature edges that are expected to be produced by fabrication of the patterned feature. For example, the reference contour may be a simulated contour that is output from an optical rule check (ORC) after optical proximity correction (OPC) operations, as will be appreciated by those of skill in the art. In some embodiments, traditional contour extraction and averaging techniques are used to provide the reference contour from images of the patterned feature. It should be appreciated that other contours corresponding to the patterned feature may be provided in operation 110 without departing from the scope of the present disclosure.

Images of the patterned feature are provided in operation 112. In the example provided, digital images from a critical dimension scanning electron microscope (CD-SEM) are loaded into the computer system that performs the operations of the method 100 to provide the images. The images include pixels with various gray scale levels that may be analyzed to extract the contours. The gray scale pixels indicate the interaction between a beam of electrons (e-beam) and the edges of the patterned feature. In some embodiments, at least two CD-SEM images are provided in which the directions of the e-beams are 90 degrees apart.

An extracted contour that represents the patterned feature is extracted from each of the images in operation 114. In the example provided, the extracted contour is extracted by analyzing the gray scale levels of the images. For example, a line of lighter pixels axially offset from a line of darker pixels may indicate an edge of the patterned feature, as will be appreciated by those skilled in the art. The extracted contours are stored as data points corresponding to the determined edge of the patterned feature.

Edge placement error (EPE) information is calculated for each extracted contour in operation 116. EPE information indicates how close the extracted contour is to the reference contour. The EPE information includes a plurality of EPE values that indicate a distance and direction between the extracted contours and a point on the reference contour. The EPE values are calculated for each extracted contour (k) relative to each point (Mi) of the reference contour. Accordingly, an EPE value corresponding to extracted contour k and reference point Mi may be represented by a vector epe(i,k).

Figure 2:
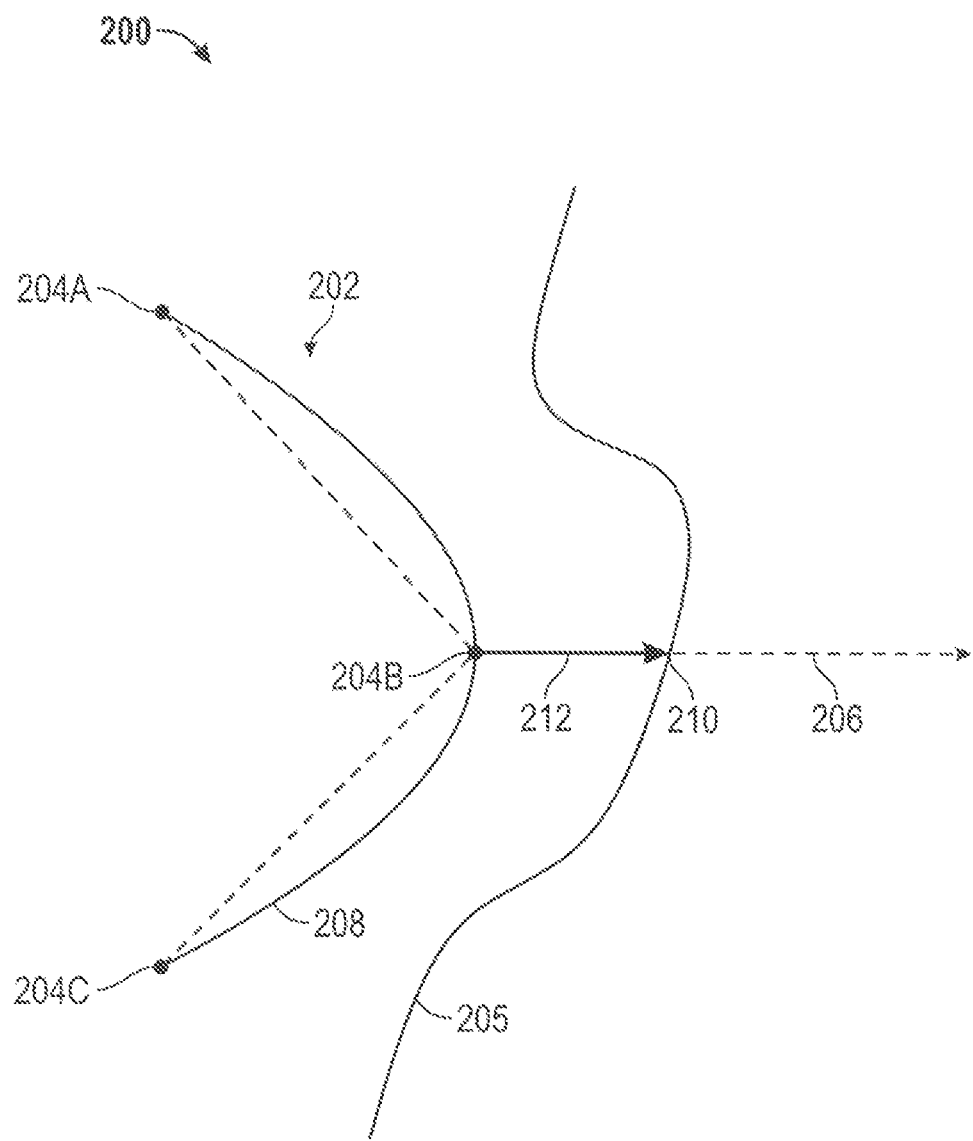
FIG. 2, FIG. 3, FIG. 4, and FIG. 5 are simplified diagrams of contour data in accordance with various embodiments.

With further reference to FIG. 2, an example of contour data 200 is illustrated in simplified diagram form. In FIG. 2, a section of a reference contour 202 is represented by three points 204A, 204B, and 204C and an extracted contour 205 is represented by a curve. A normal direction 206 to the reference contour 202 is determined by calculating a quadratic fit curve 208 using the three points 204A-C. The extracted contour 205 and the normal direction 206 intersect at an intersection point 210. The distance between the point 204B and the intersection point 210 is the scalar component of an EPE value 212 corresponding to the reference point 204B and the extracted contour 205. The directional component of the EPE value 212 may be represented by the normal direction 206. In some alternative embodiments, the EPE value 212 may be calculated based on a minimum distance between the point 204B and the extracted contour 205 without regard to the normal direction 206.

Referring again to FIG. 1, a first pass eliminates flyers from the extracted contours based on the EPE information in operation 117. Flyers are portions of an extracted contour that deviate from an expected EPE by more than a specified amount. The flyers are typically results of image noise or poor contrast of the CD-SEM image at the point of the reference contour.

Figure 3:
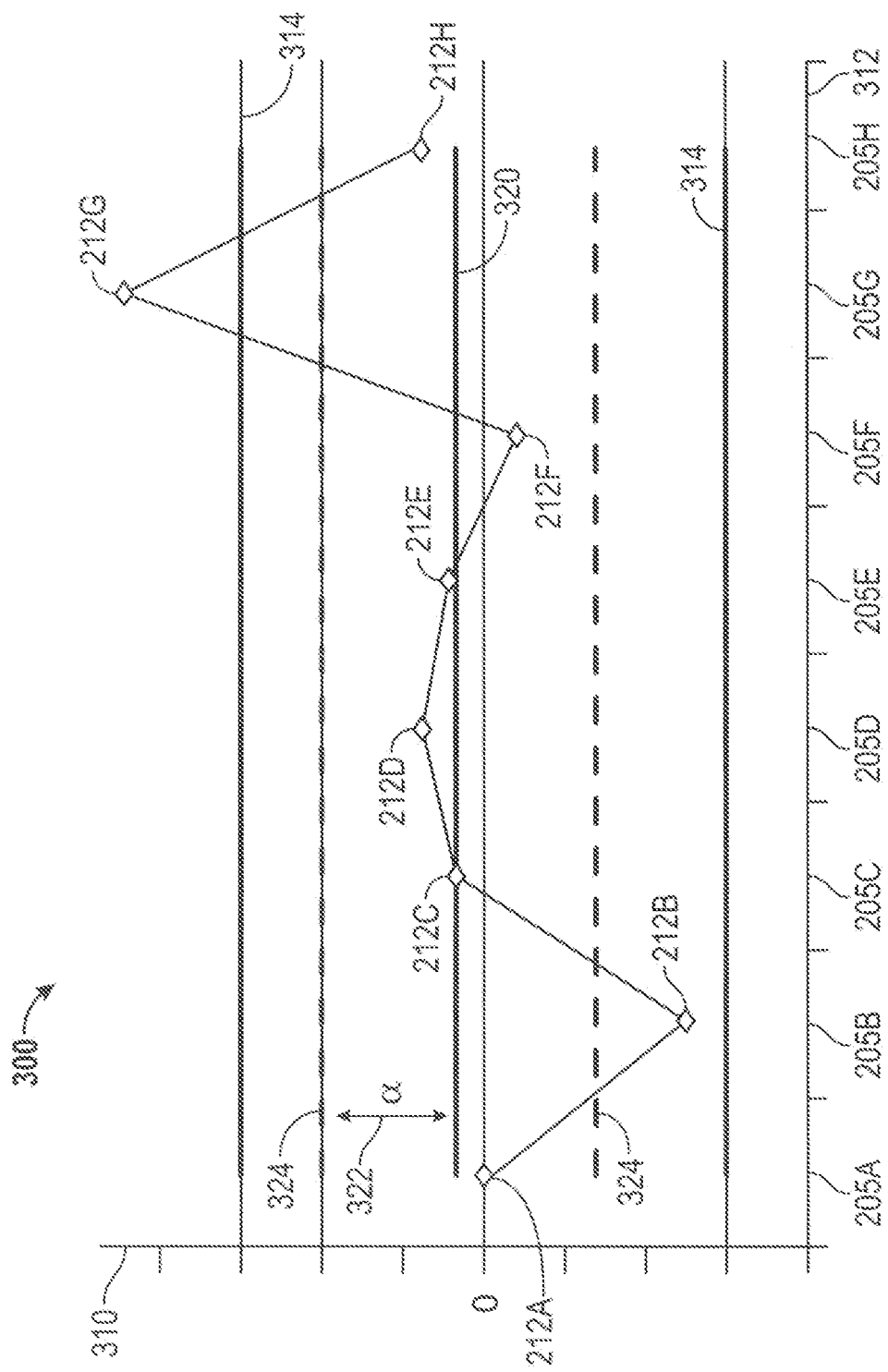

In the first pass of operation 117, flyers are removed by eliminating EPE values whose absolute value exceeds a threshold. With further reference to FIG. 3, contour data 300 is illustrated in a graphical view in accordance with some embodiments. The contour data 300 includes a threshold 314 and EPE values 212A-H for eight different extracted contours 205A-H with respect to the reference point 204B. The magnitude of the EPE values 212A-H is indicated on the vertical axis 310, while the extracted contours 205A-H are indicated on the horizontal axis 312.

EPE values that exceed the threshold 314 in the positive or negative direction are removed in the first pass. In the example of FIG. 3, EPE value 212G exceeds the threshold in the positive direction and is identified as a flyer that is eliminated in the first pass. The remaining EPE values 212A-F and 212H form a first adjusted set of contours that does not include the flyer EPE value 212G.

Referring again to FIG. 1, and with continued reference to FIG. 3, at least one statistic of the first adjusted set of contours is calculated in operation 118. In the example provided, a median 320 and a standard deviation 322 are calculated. It should be appreciated that other statistics may be calculated without departing from the scope of the present disclosure.

A second pass eliminates flyers from the first adjusted set of contours based on the at least one statistic in operation 120. In the example provided, a threshold 324 is calculated one standard deviation away from the median in both the positive and negative directions. The EPE values 212A-H that are not between the thresholds 324 are eliminated in the second pass. In other words, the EPE values that deviate from the median by more than one standard deviation are eliminated. For example, the EPE value 212B is outside of the thresholds 324 and is eliminated in the second pass of operation 120. The remaining EPE values 212A, 212C-E, and 212H form a second set of adjusted contours.

An angle between an edge of the patterned feature and a direction of the electron beam scanning in the CD-SEM is calculated in operation 122. A CD-SEM image exhibits loss of contrast when imaging patterned feature edges that are parallel to the CD-SEM electron beam scanning direction. The portions of extracted contours taken from the CD-SEM image where the feature edge is parallel to the e-beam direction have more image noise than the portions taken where the feature edge is perpendicular to the e-beam direction.

Figure 4:
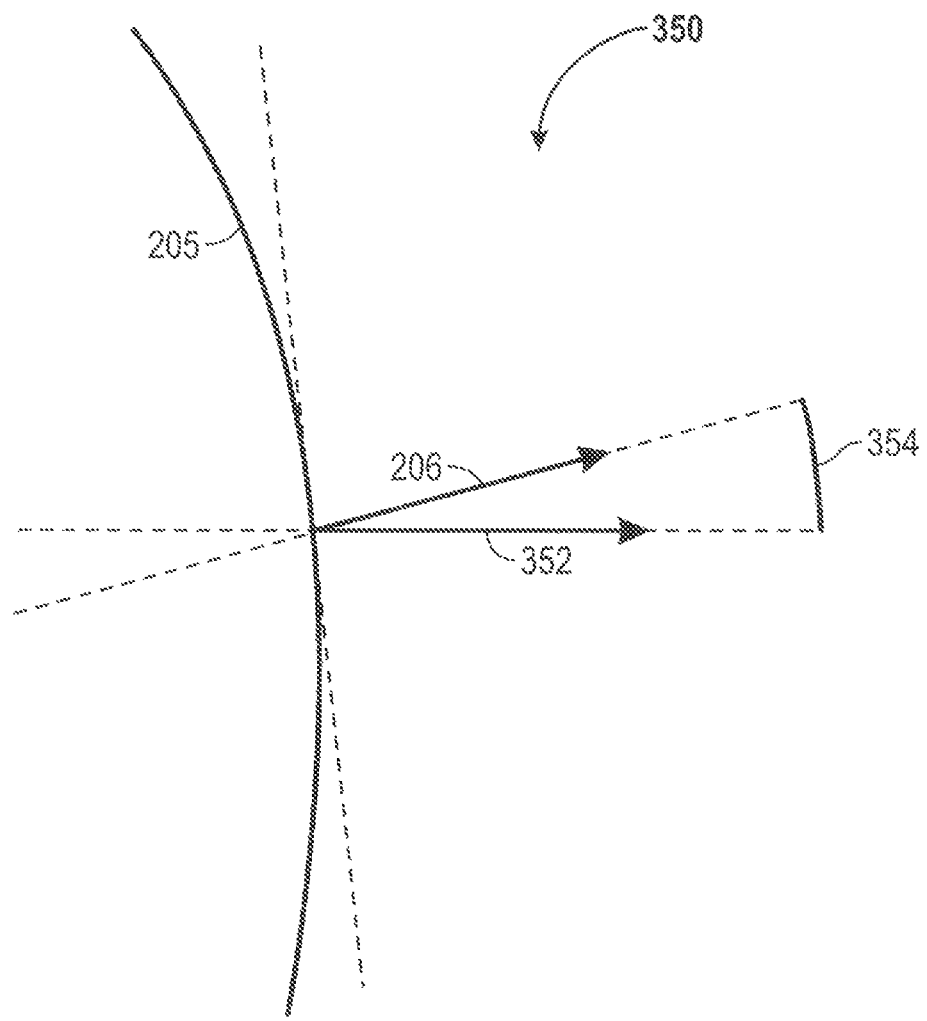

Referring again to FIG. 1, and with continued reference to contour data 350 of FIG. 4, an average contour of the patterned feature is generated based on the second adjusted set of extracted contours and the edge angle 354 in operation 124. Edge angle 354 is defined as the angle between the normal direction 206 and the e-beam scanning direction 352. The EPE values are weighted based on the edge angle, and the average contour is generated based on the weighted EPE values. A lowest weight is given when the e-beam is parallel to the patterned feature edge (e.g., 90 degree edge angle 354) when the image contrast and image noise typically produce the least accurate extracted contours. A highest weight is given when the e-beam is perpendicular to the patterned feature edge (e.g., 0 degree edge angle 354) and the image contrast and image noise typically produce the most accurate extracted contours.

For example, a mean weighted EPE value may be calculated for each point on the reference curve according to the following equation:

$$epe\_ave(i) = \frac{\sum_{k=1}^{N_3} |\cos\theta_k| \cdot epe(i,k)}{\sum_{k=1}^{N_3} |\cos\theta_k|}$$

With $$\cos\theta_k = \frac{u_{ebeam} \cdot epe(i,k)}{\|u_{ebeam}\| * \|epe(i,k)\|}$$

Where $\cos\theta_k$ is the angle between the normal direction 206 and the e-beam scanning direction 352 represented by the vector $\underline{u}_{ebeam}$, i represents the point on the reference contour, and k represents the extracted contour.

Figure 5:
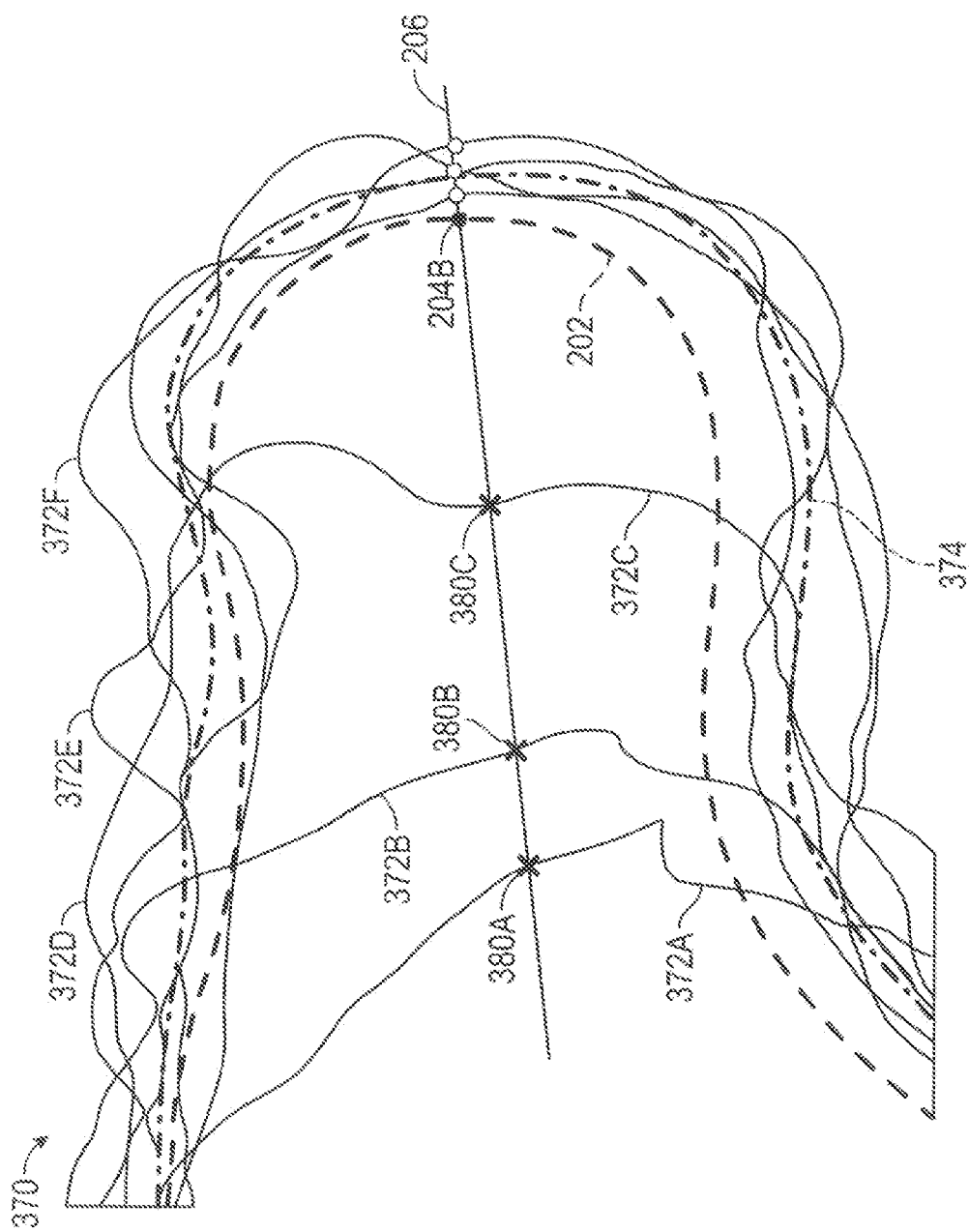

With further reference to FIG. 5, contour data 370 is illustrated in accordance with some embodiments. The contour data 370 includes some of the features of FIGS. 2-4, where like numbers refer to like components. FIG. 5, however, includes first through sixth extracted contours 372A-F and an average contour 374. Extracted contours 372A-F include flyer contour EPE values 380A-C that are removed in the first and second passes. The average contour 374 is an example of a contour generated by operation 124 of the method 100. As can be appreciated from FIG. 5, the flyer contour EPE values 380A-C have minimal impact on the average contour 374 where the average contour 374 intersects the normal direction 206.

Figure 6:
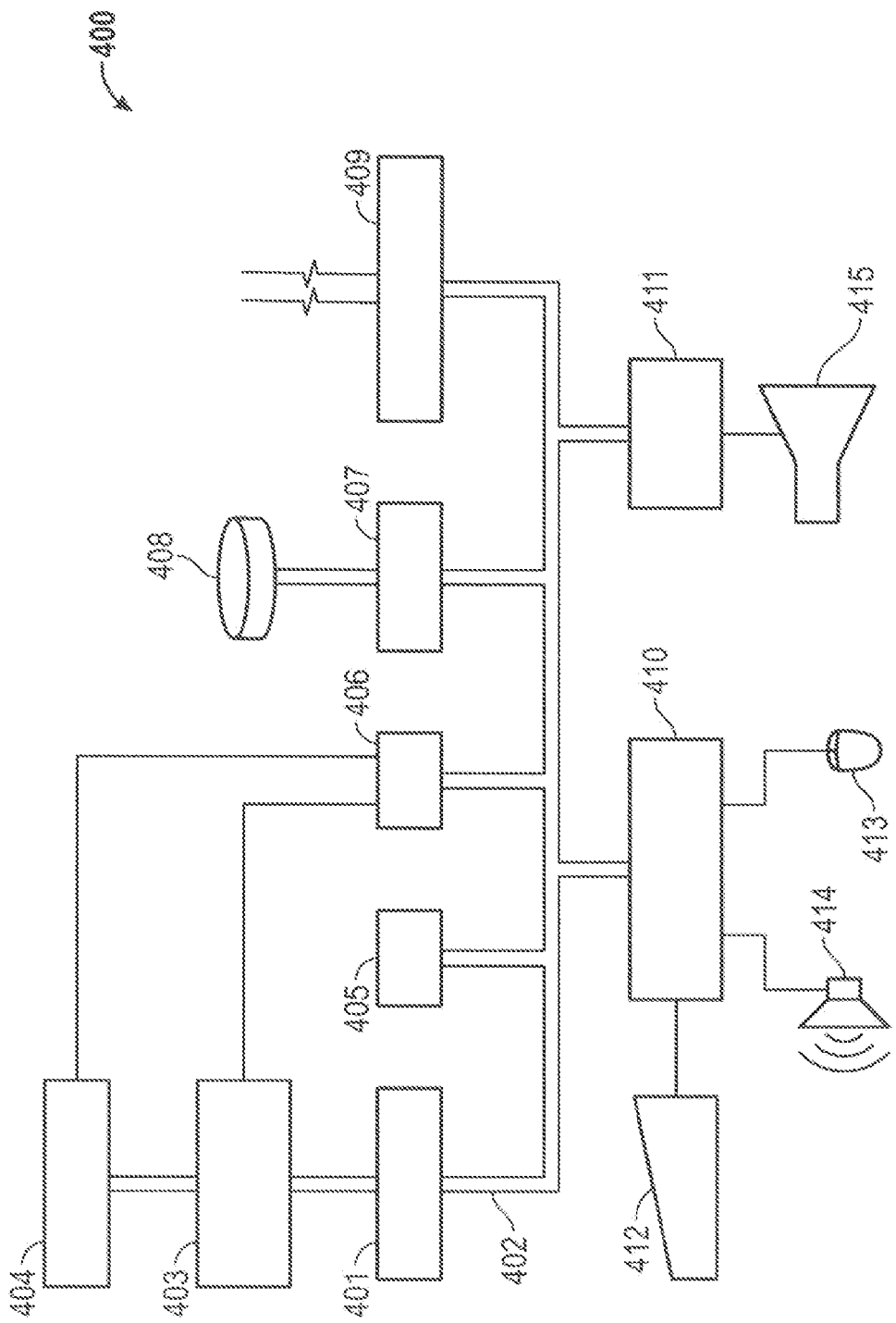
FIG. 6 is a block diagram of a computing system in accordance with various embodiments.

Advantageously, embodiments of the present disclosure can be implemented on one or more computer systems. For example, the operations of the method 100 may be performed using one or more computer systems. FIG. 6 is a schematic illustration of a block diagram of a computing system 400 arranged in accordance with some examples. Computer system 400 is also representative of a hardware environment for the present disclosure. For example, computer system 400 may have a processor 401 coupled to various other components by a system bus 402.

With further reference to FIG. 6, an operating system 403 may run on processor 401, and provide control and coordinate the functions of the various components. An application 404 in accordance with the principles of examples of the present disclosure may execute in conjunction with operating system 403, and provide calls and/or instructions to operating system 403 where the calls/instructions implement the various functions or services to be performed by application 404.

A read-only memory ("ROM") 405 may be coupled to system bus 402, and may include a basic input/output system ("BIOS") that can control certain basic functions of computer system 400. A random access memory ("RAM") 406 and a disk adapter 407 may also be coupled to system bus 402. Such memory components may be used to store, for example, the OPC model parameters or application 404 software code. It should be noted that software components, including operating system 403 and application 404, may be loaded into RAM 406, which may be computer system's main memory for execution. A disk adapter 407 may be provided which can be an integrated drive electronics ("IDE") or parallel advanced technology attachment ("PATA") adapter, a serial advanced technology attachment ("SATA") adapter, a small computer system interface ("SCSI") adapter, a universal serial bus ("USB") adapter, an IEEE 1394 adaptor, or any other appropriate adapter that communicates with a disk unit 408, e.g., disk drive.

Computer system 400 may further include a communications adapter 409 coupled to bus 402. Communications adapter 409 may interconnect bus 402 with an external network (not shown) thereby facilitating computer system 400 to communicate with other similar and/or different devices.

Input/Output ("I/O") devices may also be connected to computer system 400 via a user interface adapter 410 and a display adapter 411. For example, a keyboard 412, a mouse 413 and a speaker 414 may be interconnected to bus 402 through user interface adapter 410. Data may be provided to computer system 400 through any of these example devices. A display monitor 415 may be connected to system bus 402 by display adapter 411. In this example manner, a user can provide data or other information to computer system 400 through keyboard 412 and/or mouse 413, and obtain output from computer system 400 via display 415 and/or speaker 414.

The operations illustrated in FIG. 1 may be governed by instructions that are stored in a non-transitory computer readable storage medium and that are executed by at least one processor of the computer system 400. Each of the operations shown in FIG. 1 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Figure 7:
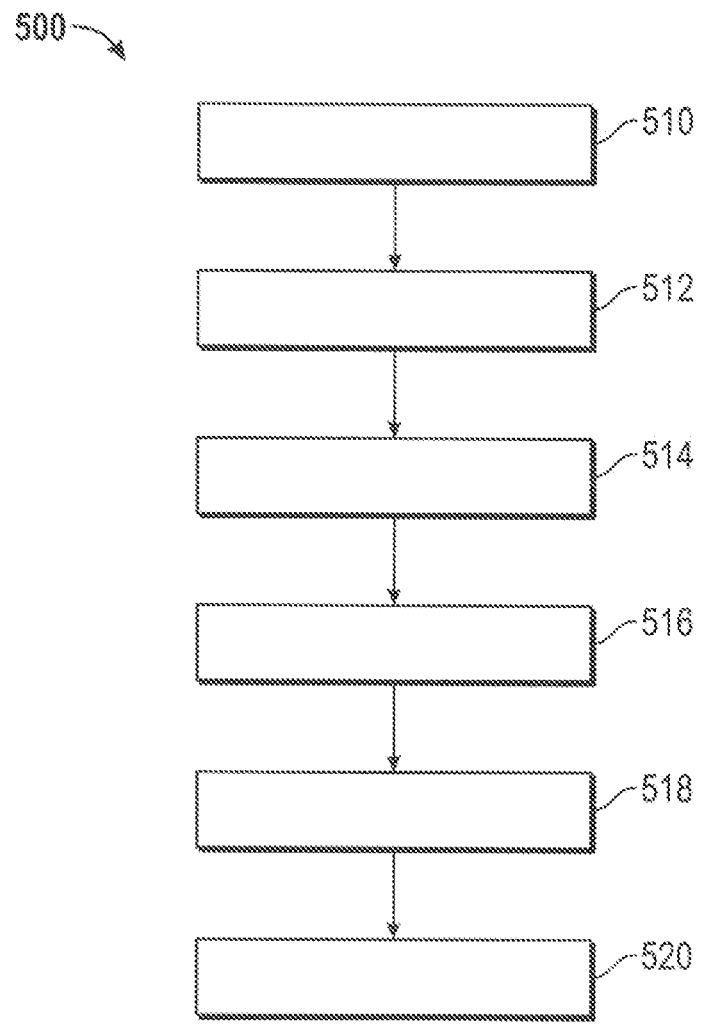
FIG. 7 is a flow diagram for a method of identifying regions with unreliable contour extraction from a patterned feature on a wafer in accordance with various embodiments.

Referring now to FIG. 7, a method 500 of identifying regions with unreliable contour extraction from images of a patterned feature on a wafer is illustrated in diagram form. The contour extraction is unreliable when the extraction of contours from the image is inaccurate, such as when the image quality of a CDSEM image is poor, as described above. The method 500 utilizes a confidence interval band to identify regions of feature contours that are to be excluded from future calculations, as will be described below. The confidence interval band is calculated with respect to a base contour, which may be the reference contour 202, the average contour 374, or a different contour that represents the patterned feature. In the example provided, the operations of the method 500 are performed by the computer system 400, and may be governed by instructions that are stored in a non-transitory computer readable storage medium.

At operation 510, the computer system 400 receives parameters associated with the confidence interval band. In the example provided, the parameters include a confidence level (1−a), a confidence band width threshold Cl_max, and an exclusion width W0. The parameters define aspects of the exclusion, as is apparent from the equations presented below. The parameters may be entered by a user or may be retrieved from a storage device. For example, a user may input the confidence level before instructing the computer system 400 to perform the operations of the method 500, or a default confidence level may be retrieved from the computer system 400 if no user input is received.

The computer system 400 calculates EPE information for extracted contours of a patterned feature on a wafer. In some embodiments, the EPE information is calculated by performing operations 110, 112, 114, and 116 of the method 100 with respect to the reference contour 202. In alternative embodiments, the EPE information is calculated by performing similar operations with respect to the average contour 374. Accordingly, an epe(i,k) value is calculated for each of the contours k (k=1 ... n) at each point $M_i$ on a base contour. It should be appreciated that epe(i,k) may be expressed as a scalar value or as a vector according to the direction that is normal to the reference curve at the point $M_i$.

The computer system 400 calculates the confidence interval band in operation 514. In the example provided, the confidence interval band is calculated based on a Student's t-distribution statistic, as will be appreciated by those with skill in the art. The confidence interval band is calculated at each point Mi for each of the n experimental contours according to the equation:

$$Cl\_band_i = 2t_{a,n-1} \frac{S_{n,i}}{\sqrt{n}}$$

where the sample mean is:

$$S_{n,i} = \sqrt{\frac{1}{n-1} \sum_{j=1}^{n} (epe_{i,j} - \overline{epe}_i)^2}$$

As described above for operation 510, the confidence level is (1−a). $t_{a,n-1}$ is given by the t-distribution for (1−a) % two-sided confidence level and n−1 degree of freedom.

Figure 8:
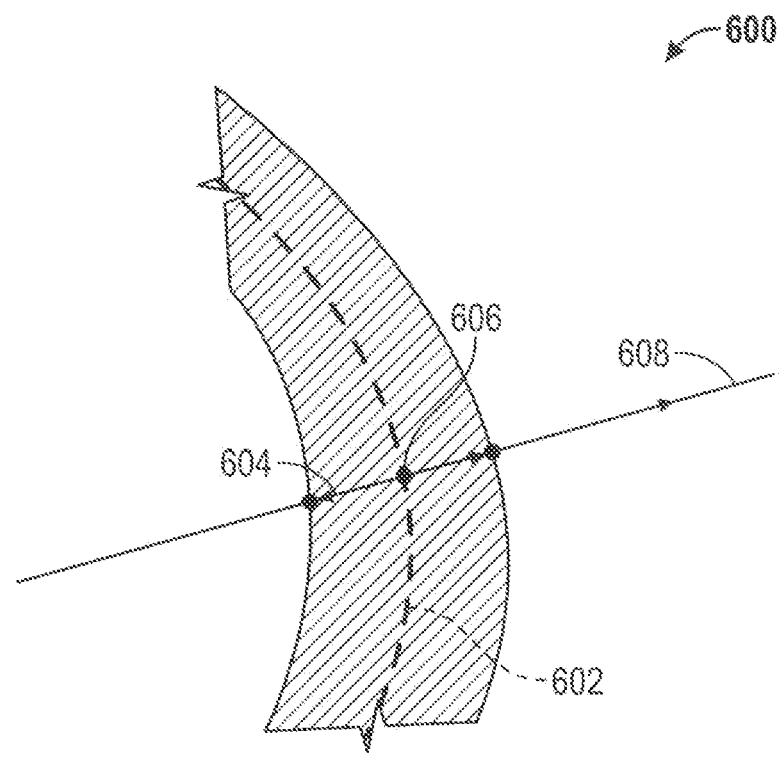
FIGS. 8-9 are simplified diagrams of confidence band intervals and exclusion data in accordance with various embodiments.

With further reference to FIG. 8, confidence interval data 600 is illustrated in accordance with some embodiments. The confidence interval data 600 includes a base contour 602 and a confidence interval band 604. The base contour 602 is the contour that defines the center of the confidence interval band 604. In some embodiments, the base contour 602 is the reference contour 202. In some embodiments, the base contour 602 is the average contour 374. The base contour 602 includes a plurality of points $M_i$ that include a point 606. A normal direction 608 is perpendicular to a tangent of the base contour 602 at the point 606.

The confidence interval band 604 is the CI_band$_i$ at point 606 of the base contour 602. The confidence interval bands are centered on the base contour 602 and are aligned with the normal direction 608.

Referring again to FIG. 7, the computer system 400 calculates which confidence band intervals CI_bandi exceed the confidence band width threshold Cl_max in operation 516. The locations where the confidence band intervals exceed the threshold indicate locations of unreliable contour extraction.

Figure 9:
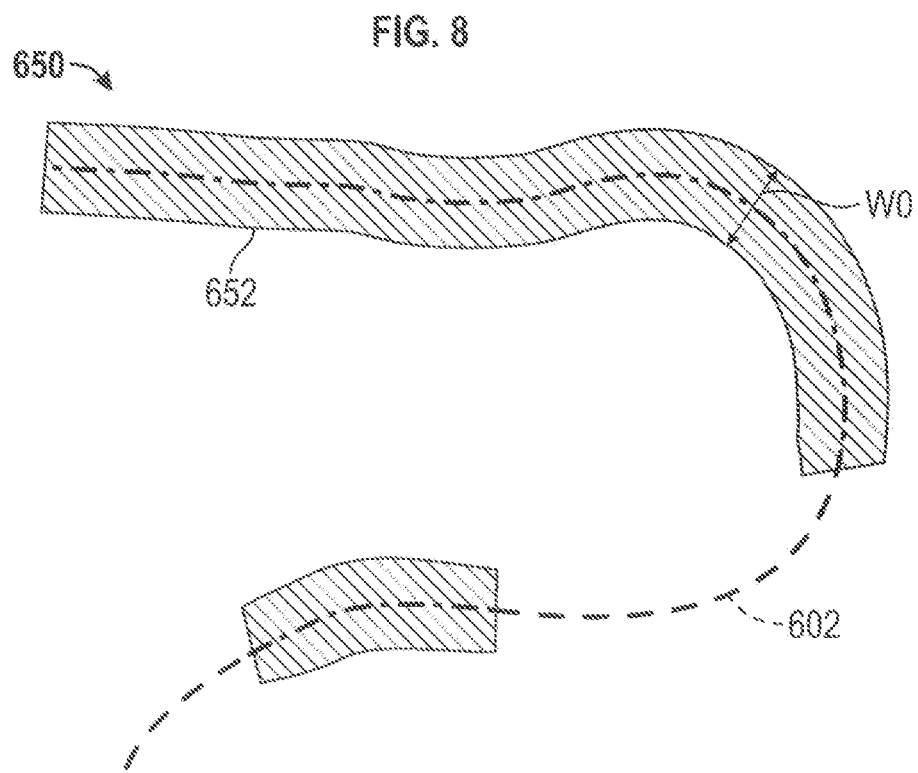

With further reference to FIG. 9, and with continued reference to FIG. 7, exclusion data 650 is generated in operation 518. The exclusion data 650 includes exclusion regions 652 that correspond with excluded points $M_i$ on the base contour 602 for which the associated confidence interval band 604 exceeds the confidence band width threshold. In the example provided, the exclusion width W0 determines the width of the exclusion region along the normal direction 608. In some embodiments, the points $M_{i+1}$ and $M_{i-1}$ surrounding the excluded point $M_i$ are incorporated into the exclusion region.

In operation 520, the computer system 400 performs contour operations based on the exclusion regions. The contour operations may be performed for all areas of a contour that are not included in an exclusion region. For example, the contour operations may include OPC activities (e.g., model building, ORC verification), lithography (e.g., tool matching), and metrology (e.g., tool matching), or other suitable operations that use the experimental contours. By excluding the regions of high variability, the method 500 limits reliance on regions of a contour that are not reliably extracted from an image.

The methods and media disclosed herein exhibit several beneficial attributes. For example, a method is disclosed that not sensitive to contouring errors such as false edge detection, local roughness of a resist, and image noise. The method further uses a simulated layer as reference to compute EPE information instead of a classical design layer. Accordingly, stability and accuracy issues—especially in the corner or region of low radius of curvature of contour— associated with use of the classical design layer are reduced. Furthermore, the averaging may be weighted based on the orientation of the reference contour with respect to the e-beam scanning direction to select only the edges with highest contrast.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of determining an average contour of a patterned feature of a wafer, the method comprising:
providing, at a computer system, a reference contour corresponding to the patterned feature to be measured on the wafer;
providing, at the computer system, a plurality of images of the patterned feature;
extracting from the plurality of images, with the computer system, a plurality of extracted contours that represent the patterned feature;
generating edge placement error (EPE) information for each extracted contour with respect to the reference contour;
eliminating flyers from the plurality of extracted contours with the computer system based on the EPE information by removing EPE information of portions of the extracted contours that deviate from an expected EPE information by more than a specified amount; and
generating, with the computer system, the average contour of the patterned feature based on the extracted contours remaining after elimination of the flyers.

2. The method of claim 1, wherein eliminating flyers further includes eliminating flyers from the EPE information in a first pass and a second pass, wherein eliminating flyers in the first pass includes eliminating flyers based on absolute values in the EPE information and eliminating flyers in the second pass includes eliminating flyers based on statistics of the EPE information after the first pass.

3. The method of claim 1, wherein generating EPE information further includes generating an EPE value for each extracted contour indicating a distance between a point on the reference contour and the extracted contour along a line that is normal to the reference curve at the point on the reference curve.

4. The method of claim 3, wherein eliminating flyers further includes eliminating EPE values whose absolute values are greater than a threshold to form a first adjusted set of EPE values.

5. The method of claim 4, wherein eliminating flyers further includes eliminating flyers based on at least one statistic of the first adjusted set of EPE values to form a second adjusted set of EPE values, and wherein generating the average contour is further based on the second adjusted set of EPE values.

6. The method of claim 5, wherein eliminating flyers based on at least one statistic further includes eliminating EPE values of the first adjusted set of EPE values based on a median EPE value and a standard deviation of the first adjusted set of EPE values.

7. The method of claim 1, further comprising calculating an edge angle between an electron beam direction for each of the plurality of images and a normal direction of the reference contour, wherein each of the plurality of images are images from a scanning electron microscope that emits an electron beam in the electron beam direction, and wherein generating the average contour is further based on a second adjusted set of the extracted contours and on the edge angle.

8. A method of inspecting a patterned feature on a wafer, the method comprising:
determining, with a computer system, an average contour of the patterned feature on the wafer, determining comprising:
providing a reference contour corresponding to the patterned feature to be measured on the wafer;
providing a plurality of images of the patterned feature;
extracting from the plurality of images a plurality of extracted contours that represent the patterned feature;
generating edge placement error (EPE) information for each extracted contour with respect to the reference contour;
eliminating flyers from the plurality of extracted contours based on the EPE information by removing EPE information of portions of the extracted contours that deviate from an expected EPE information by more than a specified amount; and
generating the average contour of the patterned feature based on the extracted contours remaining after elimination of the flyers; and
inspecting the average contour of the patterned feature.

9. The method of claim 8, further comprising generating edge placement error (EPE) information for each extracted contour with respect to the reference contour to determine the average contour, and wherein eliminating flyers is further based on the EPE information.

10. The method of claim 9, wherein eliminating flyers further includes eliminating flyers from the EPE information in a first pass and a second pass, wherein eliminating flyers in the first pass includes eliminating flyers based on absolute values in the EPE information and eliminating flyers in the second pass includes eliminating flyers based on statistics of the EPE information after the first pass.

11. The method of claim 9, wherein generating EPE information further includes generating an EPE value for each extracted contour indicating a distance between a point on the reference curve and the extracted contour along a line that is normal to the reference curve at the point on the reference curve.

12. The method of claim 11, wherein eliminating flyers further includes eliminating EPE values whose absolute values are greater than a threshold to form a first adjusted set of EPE values.

13. The method of claim 12, wherein eliminating flyers further includes eliminating flyers based on at least one statistic of the first adjusted set of EPE values to form a second adjusted set of EPE values, and wherein generating the average contour is further based on the second adjusted set of EPE values.

14. The method of claim 13, wherein eliminating flyers based on at least one statistic further includes eliminating EPE values of the first adjusted set of EPE values based on a median EPE value and a standard deviation of the first adjusted set of EPE values.

15. The method of claim 13, further comprising calculating an edge angle between an electron beam direction for each of the plurality of images and a normal direction of the reference contour, wherein each of the plurality of images are images from a scanning electron microscope that emits an electron beam in the electron beam direction, and wherein generating the average contour is further based on the second adjusted set of the extracted contours and on the edge angle.

16. The method of claim 8, further comprising generating a confidence interval band based on at least one of the reference contour and the average contour.

17. The method of claim 16, further comprising comparing the confidence interval band with a confidence band width threshold to identify regions with unreliable contour extraction.

18. A non-transitory computer readable medium storing control logic for operating a computer system, the control logic including control logic instructions for:
- providing a reference contour corresponding to a patterned feature to be measured on a wafer;
- providing a plurality of images of the patterned feature;
- extracting from the plurality of images a plurality of extracted contours that represent the patterned feature;
- generating edge placement error (EPE) information for each extracted contour with respect to the reference contour;
- eliminating flyers from the plurality of extracted contours based on the EPE information by removing EPE information of portions of the extracted contours that deviate from an expected EPE information by more than a specified amount; and
- generating the average contour of the patterned feature based on the extracted contours remaining after elimination of the flyers.

\* \* \* \* \*